United States Patent [19]
Bebb et al.

[11] 3,833,295
[45] Sept. 3, 1974

[54] ENERGY ABSORBING MOUNTING FOR OPTICAL MODULATION ASSEMBLIES

[75] Inventors: William Hobart Bebb, Penfield; Gary Boyd Gustafson, Hilton, both of N.Y.

[73] Assignee: Eastman Kodak Company, Rochester, N.Y.

[22] Filed: Mar. 16, 1973

[21] Appl. No.: 341,809

[52] U.S. Cl.................. 355/32, 240/3.1, 350/315, 355/36, 355/71
[51] Int. Cl.. G03b 11/00, G03b 17/12, G03b 27/76
[58] Field of Search.......... 355/32, 36, 71; 350/315; 240/3.1; 351/47; 354/234; 267/154

[56] References Cited
UNITED STATES PATENTS

| | | | |
|---|---|---|---|
| 3,255,666 | 6/1966 | Davis et al. | 350/315 |
| 3,377,427 | 4/1968 | Fischer | 350/315 X |
| 3,411,847 | 11/1968 | Barbieri | 355/36 X |
| 3,580,155 | 5/1971 | Zahn | 355/36 X |

*Primary Examiner*—Richard A. Wintercorn
*Attorney, Agent, or Firm*—William F. Noval

[57] ABSTRACT

In photographic apparatus having an optical axis, optical modulation assemblies such as shutter and filter assemblies which are selectively moved into and out of the optical axis are shock mounted to reduce stresses in the optical modulation material. In a preferred embodiment, a photographic color printer is provided with subtractive color filters actuated by rotary solenoids. The rotary solenoid has a rotatable mounting plate and a filter carrier is mounted on the mounting plate by means of a shock absorbing layer of dead soft rubber compound. Preferably the filter is also mounted on the filter carrier by means of the same shock absorbing material.

4 Claims, 2 Drawing Figures

PATENTED SEP 3 1974  3,833,295

3,833,295

1

ENERGY ABSORBING MOUNTING FOR OPTICAL MODULATION ASSEMBLIES

BACKGROUND OF THE INVENTION

1. Field of the Invention

This invention relates to photographic apparatus and more particularly to photographic color printers having shock mounted optical modulation devices.

2. Description of the Prior Art

In photographic apparatus it is well known to provide optical modulation devices which are selectively moved into and out of an optical axis of the device to modulate a light beam projected along the optical axis. For example, in color printers which are designed for making color prints from color negatives on color print paper using the subtractive principle, exposure is started by directing a printing beam from a white light source through the color negative onto photosensitive printing paper. As the proper exposure level is reached in each of the primary additive colors, a subtractive primary color filter is inserted into the printing beam to eliminate that color from the light striking the paper. In general, such a color filter is of frangible material, such as glass, mounted on a filter carrier which is movable into and out of the printing beam. The filter carrier is commonly mounted for rotary movement into and out of the beam by means of a rotary solenoid. In high speed color printers capable of producing several thousand color prints per hour, the number of actuations of the color filter and the frequency of actuation thereof impose extreme stresses on the filter as it is moved between the retracted and extended positions. Since the color filters must be properly aligned with the printing beam the filter carriers must be substantially rigidly mounted to the rotary solenoid mounting plate and thus stresses created by the moving mounting plate and filter carrier are transmitted to the frangible filter thus setting up undesirable shock loads therein. Frequently, the filter has been unable to sustain the shock loads created by the repeated operation thereof and frequent replacement of the filter causing undesirable down time of the color printer has occurred.

OBJECTS AND SUMMARY OF THE INVENTION

It is thus an object of the present invention to provide in photographic apparatus means for substantially reducing stresses and shock loads in optical modulation devices which are selectively moved into and out of an optical axis of the apparatus.

Generally, the present invention comprises an optical modulation device which is selectively movable into and out of an optical axis of a photographic apparatus and means for shock mounting the optical modulation device to reduce stresses therein caused by such movement. In a preferred embodiment, a filter carrier having a color filter mounted thereon is mounted on the rotatable mounting plate of a rotary solenoid by means of dead rubber-like shock absorbing material. Preferably the filter is also mounted on the filter carrier by means of similar material.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because photographic apparatus are well known, the present description will be directed in particular to elements forming part of, or cooperating more directly with, the present invention, apparatuS not specifically shown or described herein being understood to be selectable from those known in the art.

Figure 1:
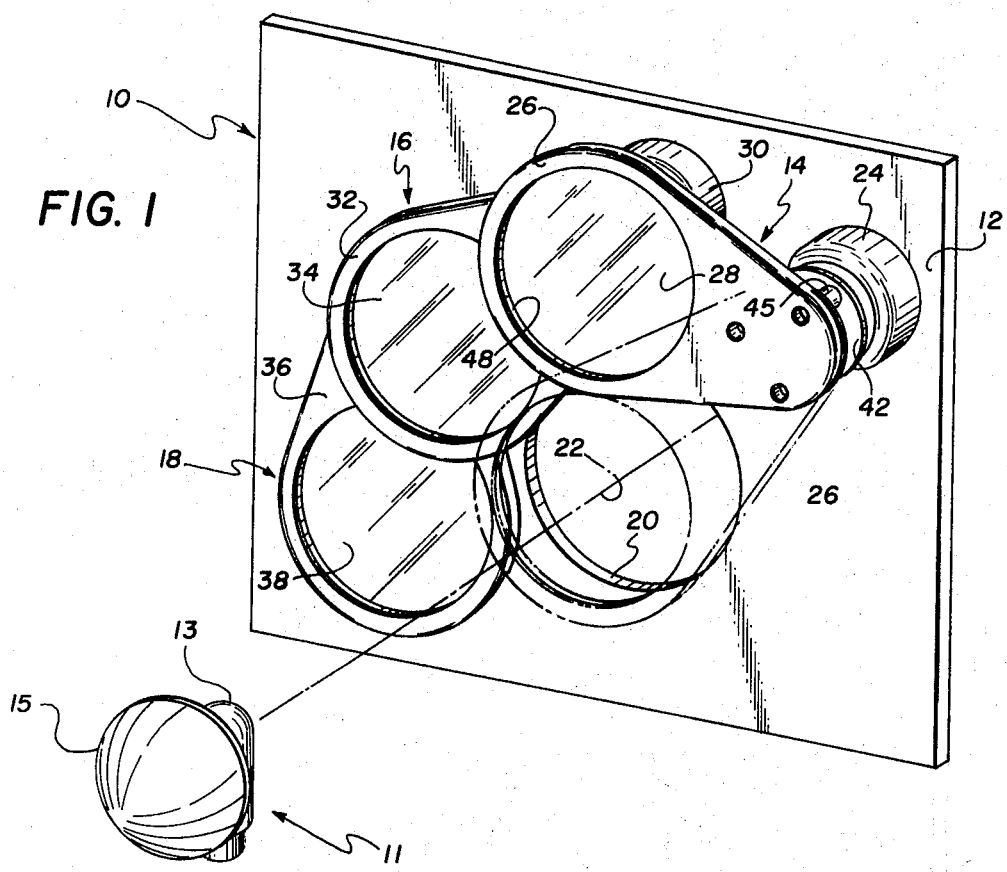
FIG. 1 is a perspective view of a plurality of color filters assemblies which are mounted for movement into and out of a printing beam of a photographic color printer.

Referring now to FIG. 1 there is shown an optical modulation assembly 10 which may be used in photographic apparatus such as a subtractive type color printer. In such apparatus a source of white light having components of the three additive primary colors projects a beam through a color negative or transparency to expose photosensitive material such as color print paper. The exposure time of each of the three primary colors is suitably controlled by exposure timers which selectively move color filters into the printing beam when the photosensitive color paper has been exposed to the proper length of time.

Optical modulation assembly 10 illustrates an assembly of three color filters which may be used in the color printer such as described above.

More particularly, optical modulation assembly 10 includes a mounting member 12 having a plurality of optical modulation devices such as filter assemblies 14, 16 and 18 mounted thereon. Plate 12 has an aperture 20 through which a printing beam from source 11 which comprises lamp 13 and reflector 15 is projected along optical axis 22.

Filter assembly 14 includes a rotary solenoid 24 mounted on plate 12 a filter carrier 26 mounted on solenoid 24 by means to be described hereinafter and a yellow filter 28 supported by carrier 26. In like manner, assembly 16 includes rotary solenoid 30, filter carrier 32 and cyan filter 34 and assembly 18 includes a rotary solenoid (not shown), filter carrier 36 and magenta filter 38. As each filter is moved into the printing beam projected along optical axis 22 it will cut off the light of one of the three additive primary colors red, blue or green from reaching the photosensitive color print material. Thus, when yellow filter 28 is moved into axis 22, blue light will be cut off from the printing paper, when cyan filter 34 is moved into axis 22 red light will be cut off and when magenta filter 38 is moved into axis 22 green light will be cut off.

As shown in FIG. 1 assemblies 14, 16 and 18 are shown in their retracted positions out of axis 22. Filter carrier 26 and filter 28 of assembly 14 however, are shown in phantom in an extended position in optical axis 22 in alignment with aperture 20 of plate 12.

Due to the frequency of operation of assemblies 14, 16 and 18 and the rapid acceleration from and deceleration to a stationary position as the filter is moved into and out of the printing beam, the torsional and vibrational stresses set up in carriers 26, 32, 36 subject filters 28, 34 and 38 to great shock loads. Since these filters are of frangible material such as glass, such shock loads can result in frequent shattering or cracking of the filter thus requiring replacement and consequent down time of the color printer. This is both inconvenient since the filter carrier and filter must normally be replaced and expensive since color print production is halted during such replacement.

Figure 2:
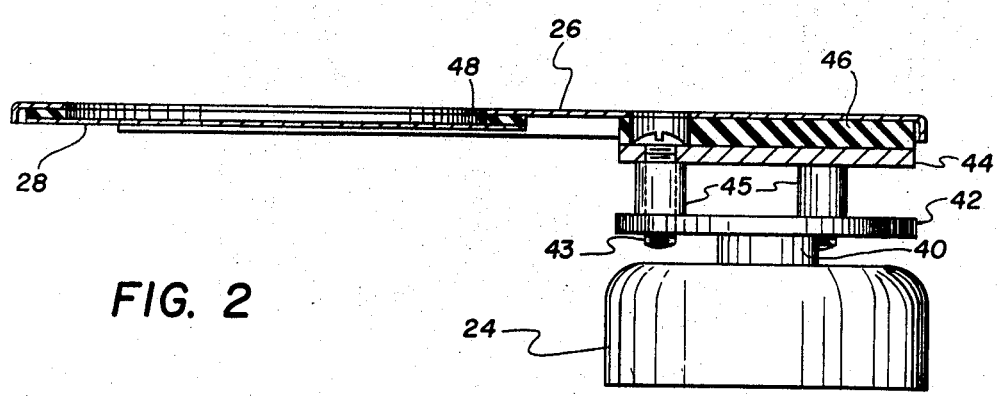
FIG. 2 is a partial sectional elevational view of one of the filter assemblies shown in FIG. 1 illustrating the energy absorbing mounting according to the present invention.

Referring now to FIG. 2 there is shown an embodiment of the present invention wherein the stresses and shock loads created by operation of the filter assembly is minimized by means of an energy absorbing or shock mounting. As shown, rotary solenoid 24 is provided with a rotary shaft 40 haVing a mounting plate 42 affixed thereto. A filter carrier mounting plate 44 is secured to plate 42 by means of bolts 43. Spacers 45 are provided to permit mounting of assemblies 14, 16 and 18 in staggered relationship in the direction of optical axis 22.

Filter carrier 26 is secured to plate 44 by means of an energy absorbing or shock mounting comprising a dead soft shock absorbing rubber-like compound such as compound number E068 R BTR manufactured by the Lord Company. This compound absorbs a substantial amount of the shock loads created by the repeated movement of filter carrier 26 by the rotation of solenoid 24. Consequently, the stresses to which filter carrier 26 would normally be subjected are minimized, thus minimizing the buliding up of such stresses in filter 28. Energy absorbing layer 46 also reduces the amount of filter carrier bounce when the carrier is brought to a halt either in its extended or retracted position thus further decreasing the stresses to filter 28.

Preferably filter 28 is also mounted to filter carrier 26 by an energy absorbent layer 48 made of similar dead-soft rubber-like material. Layer 48 provides additional energy absorbing and shock mounting capability and further reduces the chance of breakage of filter 28 thus further increasing the life thereof.

Thus, it is seen that there has been provided an optical modulation assembly including a filter assembly which is mounted for movement into and out of a printing beam of a color printer having an energy absorbing mounting which prolongs the life of the filter by absorbing shock loads created by the rapid movement of the filter into and out of the optical axis of the printer.

The invention has been described in detail with particular reference to preferred embodiments thereof, but it will be understood that variations and modifications can be effected within the spirit and scope of the invention.

What is claimed is:

1. In photographic apparatus having an optical axis; the combination comprising:

optical modulation means for optically modulating a beam of light projected along said optical axis;

support means for supporting said modulating means for movement between a first position wherein said modulating means is out of said optical axis and a second position wherein said modulating means is in said optical axis;

drive means for drivingly moving said support means between said first and second positions;

first shock absorbing means for mounting said support means on said drive means; and second shock absorbing means for mounting said optical modulation means to said support means;

said first and second shock absorbing means substantially absorbing any shock loads created by movement of said support means between said first and second positions.

2. In a photographic color printer having an optical axis and means for projecting a beam of light along said optical axis, said beam of light having at least first and second color components, the combination comprising:

a color filter for filtering said first color component from said beam of light;

support means for supporting said color filter for movement between a first position wherein said color filter is out of said optical axis and a second position wherein said color filter is in said optical axis to filter out said first color component from a beam of light projected along said optical axis;

drive means for drivingly moving said support means between said first and second positions;

first shock absorbing means for mounting said support means on said drive means; and second shock absorbing means for mounting said color filter on said support means;

said first and second shock absorbing means substantially absorbing any shock loads created by movement of said support means between said first and second positions.

3. The combination of claim 2 wherein said first and second shock absorbing means comprises a dead soft rubber-like material.

4. In a photographic color printer having an optical axis and means for projecting a beam of light along said optical axis, said beam of light having at least first and second color components, the combination comprising:

a color filter for filtering said first color component from said beam of light;

a filter support member;

first shock absorbing material for mounting said filter to said support member;

a shaft;

a mounting plate mounted on said shaft;

second shock absorbing material for mounting said filter support member to said mounting plate;

means for mounting said shaft for rotation between a first position wherein said filter is positioned to intercept said beam of light and a second position wherein said filter does not intercept said beam of light; and means for rotating said shaft between said first and second position.

* * * * *